(12) United States Patent
Dunagan et al.

(10) Patent No.: US 9,620,828 B2
(45) Date of Patent: Apr. 11, 2017

(54) PROCESS FOR RECYCLING VOLATILE BATTERY SOURCES

(71) Applicant: RECYCLING COORDINATORS, INC., Akron, OH (US)

(72) Inventors: Dennis J. Dunagan, Akron, OH (US); Teague C. Ostrander, Akron, OH (US)

(73) Assignee: RECYCLING COORDINATORS, INC., Akron, OH (US)

( * ) Notice: Subject to any disclaimer, the term of this patent is extended or adjusted under 35 U.S.C. 154(b) by 0 days.

(21) Appl. No.: 15/270,860

(22) Filed: Sep. 20, 2016

(65) Prior Publication Data
US 2017/0012328 A1 Jan. 12, 2017

Related U.S. Application Data

(62) Division of application No. 14/484,886, filed on Sep. 12, 2014, now Pat. No. 9,450,277.

(60) Provisional application No. 61/877,567, filed on Sep. 13, 2013.

(51) Int. Cl.
| | | |
|---|---|---|
| *A62D 3/36* | (2007.01) |
| *H01M 10/54* | (2006.01) |
| *H01M 10/0525* | (2010.01) |

(52) U.S. Cl.
CPC ....... *H01M 10/54* (2013.01); *H01M 10/0525* (2013.01)

(58) Field of Classification Search
CPC .......................................... A62D 3/36
USPC ....................................... 588/318
See application file for complete search history.

(56) References Cited

U.S. PATENT DOCUMENTS 9,450,277 B2 * 9/2016 Dunagan ............... H01M 10/54

* cited by examiner

*Primary Examiner* — Edward Johnson
(74) *Attorney, Agent, or Firm* — Hahn Loeser + Parks LLP; Scott M. Oldham, Esq.

(57) ABSTRACT

The invention is directed to systems and methods for the recycling of lithium ion batteries or the like. The system methods include comminution and destruction of used batteries, controlling the explosive reaction of the battery components during processing, and processing the materials into a suitable form for sampling and recycling.

17 Claims, 3 Drawing Sheets

PROCESS FOR RECYCLING VOLATILE BATTERY SOURCES

CROSS-REFERENCE TO RELATED APPLICATION/INCORPORATION BY REFERENCE

This application is a divisional of co-pending U.S. application Ser. No. 14/484,886 filed Sep. 12, 2014, which in turns claims the benefit of U.S. Provisional Patent Application Ser. No. 61/877,567 filed on Sep. 13, 2013, all of which are incorporated herein by reference.

BACKGROUND

For a wide variety of products, lithium batteries have been extensively used as a power source. Though providing exceptional characteristics as a power source, at the end of the useful life of these batteries, they pose health and environmental concerns. Lithium-ion batteries are expensive to manufacture and this is mainly due to the high raw material cost and complex preparation processes. The most costly metal of most Li-ion is cobalt, and the price of lithium has been rising quickly due to higher demand. There is a need to recycle lithium Ion batteries that are used or spent by consumers, companies, military and government. Although, this type of battery does not contain harmful metals such as mercury, cadmium and lead, it still represents a significant a danger to our landfills, as the contents and battery components are volatile and combustible. The danger lies in the charge that some of these cells may still contain, which could lead to causing a fire. Land fill fires are difficult to extinguish, very costly and can last days, months or even years. Additionally, some Li-ion cells are produced to look and function as a replacement to lead acid batteries. The concern is some of these Li-ion batteries are reaching lead acid recycling facilities because they look the same. If a battery with Li-ion chemistry were to enter the lead acid battery recycling process, it could cause a significant hazard.

Attempts at processing Li-ion batteries include incinerating them in a calciner. This renders them inert but is very costly and results in explosive combustion of the batteries that pose risks in terms of noxious materials and off gases that need to be scrubbed or put through an after burner, as well as degradation of the calciner itself. If whole batteries enter a smelter where valuable battery components can be extracted, they will explode on entering the smelting process. This can send molten metal flying, potentially causing serious harm or death to workers. Using a calciner is just a way to control the explosions in a safer environment, but at a high cost, as it is very damaging the calciner. Inside the calciner Li-ion batteries react similar to small missiles violently shooting around. This results in significant damage to the calciner, including to the brick interior lining. Costs associated with this process include the cost of natural gas, maintenance shutdown due to damage, and the need to after burn any residual organics from calciner. All of these costs are included in the value, if any, the battery collectors receive from their end markets. This usually transitions to a monetary charge the battery collectors pass on to the public, corporate and government entities to recycle their used batteries. It would be desirable to have systems and processes that avoid these costs. The ability to reduce costs in turn make it more feasible and cost effective for recycling used/spent Li-ion batteries. As there are efforts to collect these types of cells, there is a need for a safe, cost effective recycling that allows for reclamation of the components of lithium batteries. As the need for high energy batteries, such as lithium ion batteries, the use of such batteries or like batteries with similar disposal problems will be used in greatly increased quantities, and the need for an effective and cost-efficient system and process to allow recycling and reclamation of the components.

The chemistry and safety characteristics can vary across lithium ion battery types. For example, handheld electronic devices may use chemistry based on lithium cobalt oxide (LiCoO2), which offers high energy density, but presents safety risks, especially when such batteries are destructed. Other types of lithium ion batteries include lithium ion phosphate (LFP), lithium manganese oxide (LMO) and lithium nickel manganese cobalt oxide (NMC), which offer lower energy density, but longer lives and better safety characteristics. Such batteries are widely used for electric tools, medical equipment and a wide variety of other applications. NMC is particularly useful for automotive and aerospace applications for example. Lithium nickel cobalt aluminum oxide (NCA) and lithium titante (LTO), as well as lithium/sulfur dioxide, lithium/sulfuryl chloride, lithium/iodine, lithium/iron disulfide, lithium/polymer, lithium/magnesium dioxide or lithium/carbon monofluoride batteries, have also been developed for applications. Further, there may be a need to recycle batteries utilizing other hazardous anode, cathode and electrolyte combinations such as nickel/metal hydride or sodium/sulfur sodium/nickel batteries.

In each of these configurations, lithium-ion or possibly other batteries can be dangerous and can pose a safety hazard since they contain a flammable electrolyte and are also kept pressurized. For example, the overheating or overcharging of the battery may result in thermal runaway and cell rupture, which in turn can lead to combustion. This same effect is realized upon destruction of the battery. In an attempt to reduce these risks, lithium-ion battery packs may contain fail-safe circuitry that shuts down the battery when its voltage is outside a safe range. These systems as well as other organics used in the batteries can also pose problems when attempting to recycle and reclaim the battery components. Additional issues in recycling and reclaiming the battery components are caused upon short-circuiting the battery, which will cause the cell to overheat and possibly to catch fire. Extinguishing this fire is dangerous as lithium burns violently when it comes in contact with water or moisture in the air. This along with the flammable electrolyte result in the significant safety and environmental concerns during destruction and recycling of the batteries. The manufacturing processes of nickel and cobalt for the cathode and also the solvent also present potential environmental and health hazards in relation to recycling.

The disposal of lithium or like batteries can be extremely dangerous because the cell components as well as the products created on discharge of the cells are unstable and the battery destruction process can result in explosive reactions, fires and the release of corrosive and toxic byproducts. It would be desirable to have systems and methods which effectively neutralizes the battery components, while quenching reactions of such components.

It would also be desirable to allow for accurate sampling for assessment of value of the battery components. As the components that can be reclaimed are of small quantities, any attempt to recycle batteries may be hampered by the inability to properly assess the value of the components. Enabling sampling of the batteries to be recycled would allow a accurate assessment of value and proper payment to the supplier of the batteries for recycling.

SUMMARY

The present invention is directed to systems and methods designed for the recycling and reclamation of lithium ion or other batteries utilizing other hazardous anode, cathode and electrolyte combinations. The invention is directed to systems and methods for the safe and controlled destruction, neutralization and subsequent reclamation of valuable battery components and materials. In an example, the system includes comminuting and destruction of used batteries which avoids the release of toxic materials, quenches or controls the explosive reaction of the battery components and fire during processing, and places the materials generated in the destruction process in a suitable form for sampling and recycling. The system may comprise a first feeder system to meter batteries for recycling into a first comminuting apparatus, such as a shredder. A neutralizing medium is provided to accept the comminuted batteries from the first comminuting apparatus. A second comminuting apparatus, such as a sizing shredder, which includes integral sizing of the comminuted material, or a sizing system may be used in conjunction with the second comminuting apparatus, to produce a substantially homogenous material having a predetermined size distribution. A sampling system is provided to sample the substantially homogenous material to assess the components of the battery material and value thereof.

In another example, the invention is directed to a process for the recycling of electrical storage batteries having hazardous anode, cathode and electrolyte combinations, such as lithium ion batteries. A source of batteries is supplied, and a first step of comminuting the batteries is performed to expose the volatile components thereof. The comminuted batteries are introduced into a neutralizing medium, such as a brine solution, and the volatile components are neutralized and chemical reactions are quenched or controlled to prevent combustion. The brine solution both induces ion exchange to cause the neutralization and discharge of comminuted battery components. A second step of comminuting the neutralized comminuted batteries is carried out to form a substantially homogenous material having a predetermined size distribution. The substantially homogenous material can then be sampled to assess the components of the battery material and value thereof.

In a further example, the invention is directed to systems and a process for the recycling of electrical storage batteries having hazardous anode, cathode and electrolyte combinations, such as lithium ion batteries. A source of batteries is supplied, and a first step of comminuting the batteries is performed to expose the volatile components thereof. The comminuting products of the batteries are contained in a containment chamber and the volatile chemical reactions and combustion products from comminuting are evacuated from the containment chamber. A second step of comminuting the neutralized initially comminuted batteries is carried out to form a substantially homogenous material having a predetermined size distribution. The substantially homogenous material can then be sampled to assess the components of the battery material and value thereof.

BRIEF DESCRIPTION OF THE DRAWINGS

These and other features, aspects and advantages of the present invention will become better understood with reference to the following description, appended claims, and accompanying drawing, where:

DESCRIPTION OF THE INVENTION

The primary objective of the invention is to allow the destruction of a battery composed of hazardous materials without creating a hazardous condition and to allow sampling of the battery materials for assessing value of components for reclamation. The systems and processes eliminate hazardous conditions and materials to allow safe recycling of the valuable components of batteries, such as lithium ion batteries or other batteries utilizing other hazardous anode, cathode and electrolyte combinations.

Figure 1:
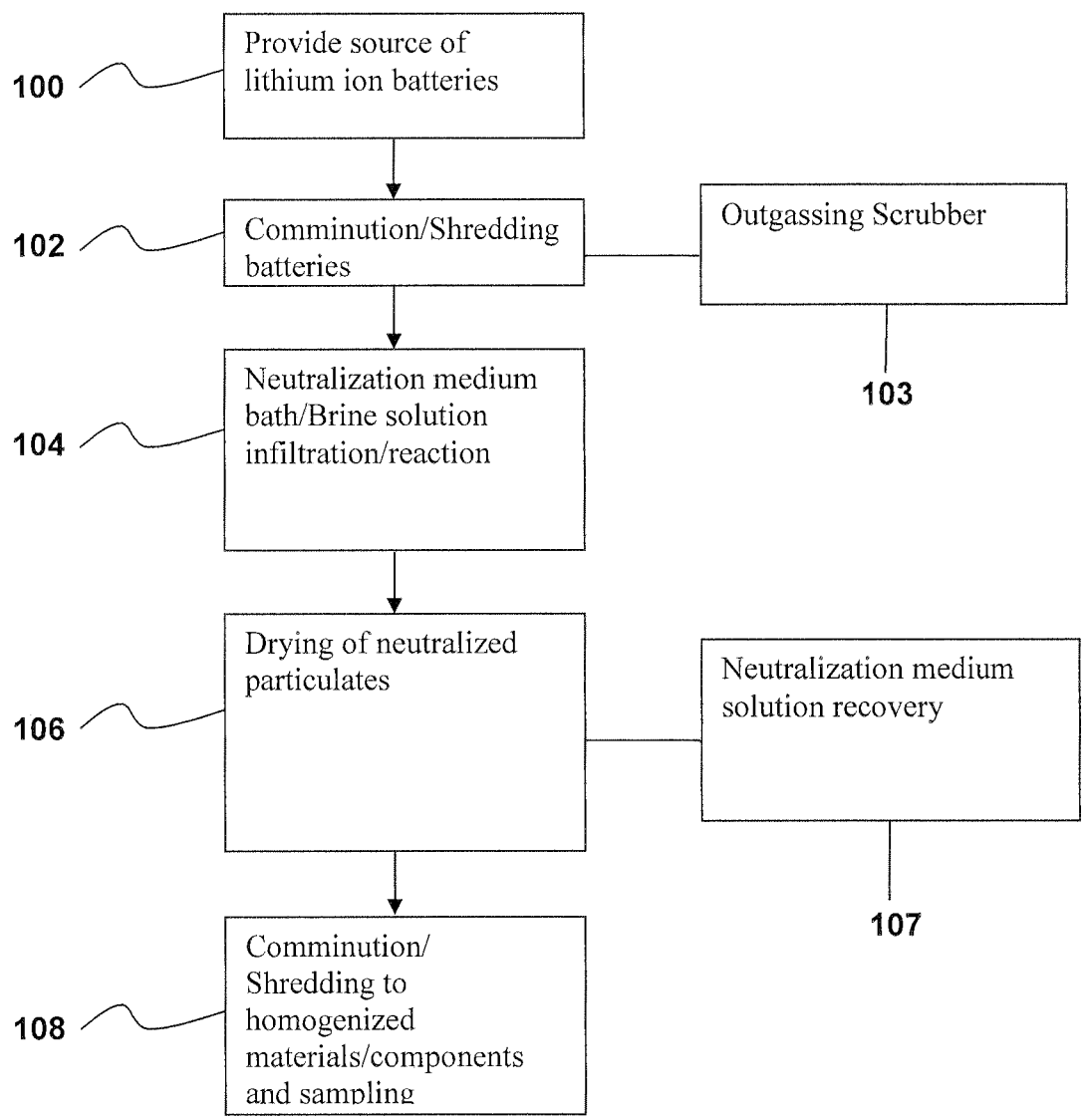
FIG. 1 is a schematic diagram showing an example system and process for treatment of lithium ion batteries for recycling and reclamation.

In an example of the system and process of the present invention, with reference to FIG. 1, a source of lithium batteries 100 is provided. In many cases, such batteries may be used, and substantially discharged, or may have residual or substantial charge. As the condition of the battery source may vary, the systems and methods allow for the recycling and reclamation of valuable battery components with any such source 100. Though it may be possible to discharge remaining charge in the batteries, and such could reduce the violent reactions upon short circuiting of the batteries, it is not required that such discharge be performed.

The source of batteries 100 will typically include a plurality of batteries, which may be of a particular type or may be a mixture of different battery types and configurations. Depending on the type of batteries, it may be desirable to meter the batteries into the systems for further processing. The batteries 100 are introduced into a first comminunution or size reducing system 102, such as a shredding machine. For example, a first comminuting system may be a shredder, such as a Nelmor model V2727 rotary shear shredder or other suitable system, that cuts the batteries into smaller pieces that destroy individual cells in the batteries and cause reaction of the components thereof. This step in general may produce a rough shredding or comminuting of the batteries for further processing. At this stage the battery components are reactive and result in creation of combustion and reaction products. To avoid introducing the combustion and reaction products into the environment, which could cause hazardous conditions, a scrubbing system 115 may be provided to extract such products at the site of the comminuting 110. A suitable scrubbing system may be a 40-H Whirl Wet machine as manufactured by Tri-Mer Corporation, or other suitable systems. The scrubbing system 103 may use an alkaline scrub solution and filters, with any discharge materials scrubbed and any washing solutions captured and cleaned for reuse. The scrubbing system 103 will remove any possible noxious materials and off gases that may be generated before further processing of the initially comminuted battery materials. Alternatively, the initial comminution system and step may be performed to produce a substantially uniform and homogenous comminuted material having a size distribution below about one inch. The substantially uniform and/or homogenous material is of a nature to allow assessment of the components in the material, such as the valuable components to be extracted and recycled. The material is comminuted to have a substantially homogenous or uniform composition and properties to allow sampling and effective assessment of the components in the mixture, particularly of the valuable components therein. The effective assessment of the components of the mixture from sampling may therefore not require homogenization to a high degree, but only to the point of allowing for effective assessment of the materials for determining a reasonable value for recycling.

The initially comminuted material is then disposed into a neutralization medium bath 104, such as a brine solution. This causes infiltration of the neutralization medium 104 into contact with the battery components and destroyed battery cells, to neutralize the chemical reactions caused by the destruction of the cells. In an example, the neutralization medium bath is a six percent brine solution, but other suitable neutralization solutions may be used. The neutralization medium bath 104 may be in a disposed in a stainless steel basket or container situated to accept the comminuted materials from the comminution system 102. Alternatively, the comminuted materials may be continuously further processed by submersion into a bath of neutralization medium on a conveyor system, with sufficient residence time to neutralize the materials. After disposition of the initially comminuted materials in the neutralization medium bath 104, the materials are retained in the neutralizing medium for a predetermined residence time. The residence time may be between 24 to 48 hours, or other suitable times, depending on the nature of the comminuted battery materials or the neutralizing medium, until the chemical reactions are substantially neutralized. If desired, at least one sensor may be provided in association with the neutralization medium bath and/or container it is in, to detect when such neutralization occurs to allow further processing.

After neutralization of the initially comminuted battery materials, the materials are removed from the neutralization medium bath and may be dried at 106. Any suitable drying may be performed, simply by air drying the material or a suitable heating or fan system, or liquid extraction system may be used to accelerate drying. The step of drying allows for easier handling of the material for further processing, but may not be necessary depending on the form of the materials upon removal from neutralization medium. The neutralization medium solution may also be recovered for further use at 107.

The initially comminuted and neutralized materials are then subjected to a further comminution step at 108, to produce a substantially uniform and homogenous material. In an example, a suitable system for further comminution of the materials may be a VAZ 200-160 shredder manufactured by Vecoplan. This type of shredder includes a screening system to allow formation of the substantially homogenous distribution of materials making up the entire contents of the battery source 100. In the initial and further comminution steps (if performed), fines as well as larger particles of battery components including the packaging materials, but forming a substantially homogenous distribution of materials making up the entire contents of the battery source 100. Alternatively, a separate screening system may be used to form the substantially homogenous distribution of materials making up the entire contents of the battery source 100. This allows the substantially homogenous materials to then be sampled and tested 108 to allow proper assessment of the value of the reclamation products of the battery source 100. The ability to properly assess the value of the reclamation products will allow effective recycling of the battery source 100. Without the ability to test and assess the proper value, recyclers are unable to accurately cost out and profit from the recycling, posing a significant obstacle. According to the example of the invention, the formation of a substantially homogenous material allows a sample to be taken which is properly representative of the value. In this example, the comminution system 108 may feed an auto-sampler to automatically taking samples from the stream of processed material as it is created. Thereafter, the materials can simply be packaged and forwarded to a smelting facility where the materials are processed to reclaim the valuable materials therefrom. The substantially homogenous distribution of neutralized materials making up the entire contents of the battery source 100 also provide an ideal stream for introduction into a smelter for reclamation of the battery components.

Figure 2:
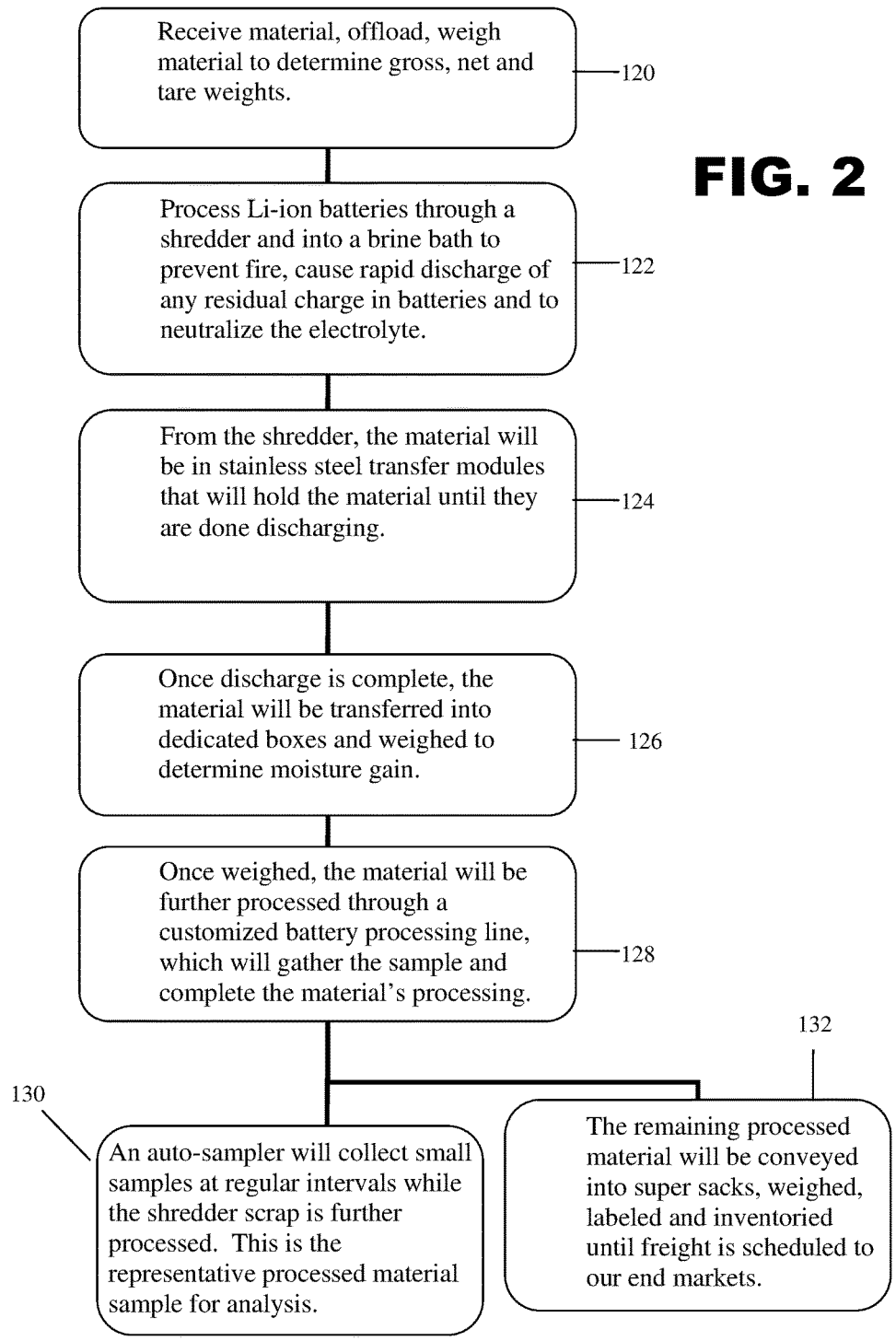
FIG. 2 is a schematic diagram showing further aspects of an example system and process.
Figure 3:
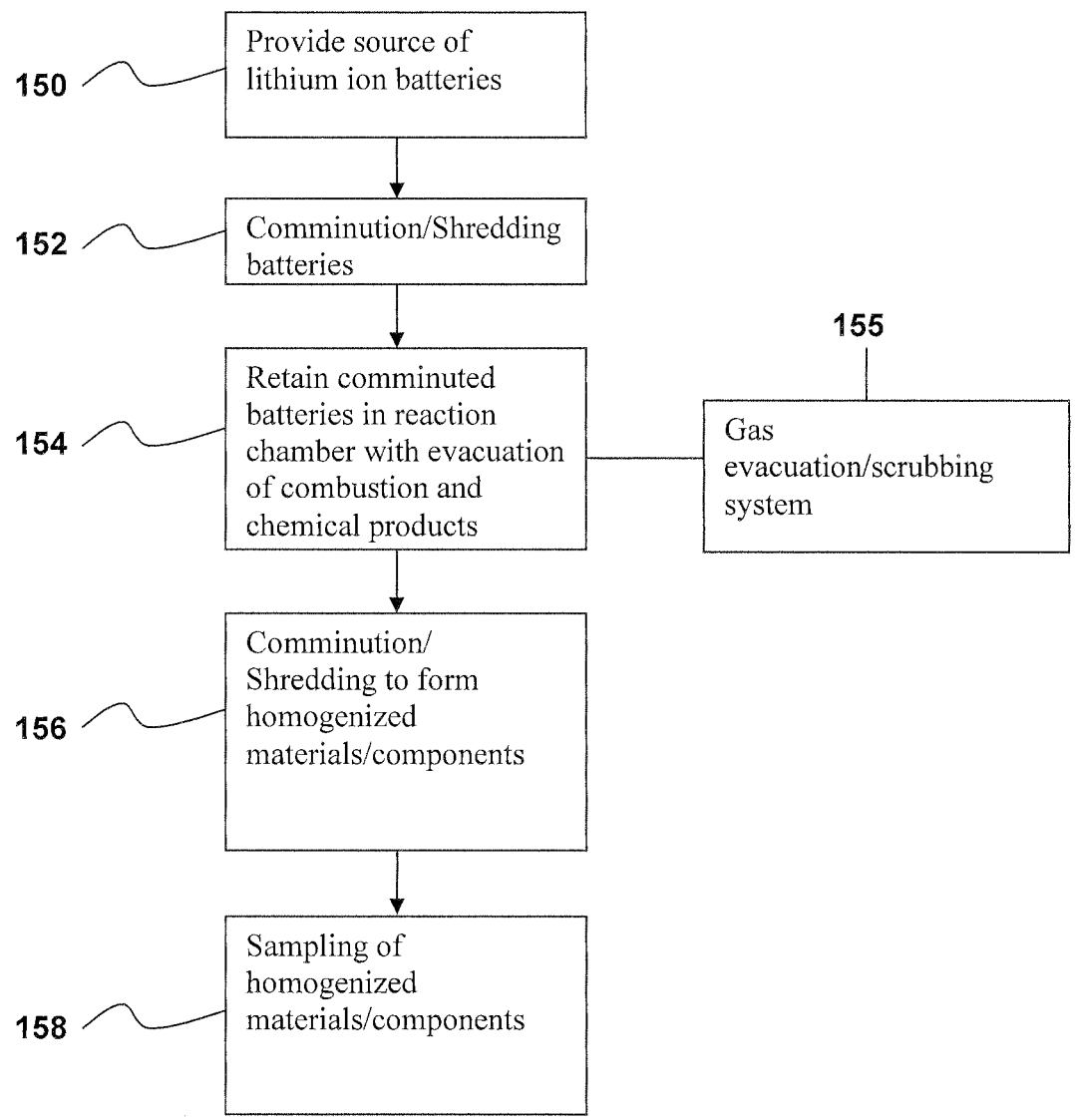
FIG. 3 is a schematic diagram showing further aspects of an example system and process.

The present invention is employed to safely and economically recover valuable materials from Li-ion or like batteries or power sources. The system and method is well suited to the processing of discarded lithium batteries, and in a more particular example as shown in FIG. 2, the recycling process may proceed as follows. At 120, the Li-ion batteries are collected and delivered to the reclamation site where the load of batteries is offloaded and weighed to obtain the gross, net and tare weights. The load of batteries is then processed through a shredder and disposed in a brine bath to prevent fire and cause rapid discharge of any residual charge in the batteries and neutralize the electrolyte and other volatile components at 122. From the shredder, the material may be disposed within stainless steel transfer modules at 124 that will allow the material to reside in the neutralization medium until discharge and neutralization is complete. Once discharge is complete, the material may again be weighed to determine any moisture weight gain at 126. After weighing, the material is further processed through a customized battery processing line including the possible step of further size reduction of the materials at 128. At least one sample is taken from the further processed material, such as via an auto-sampler, which will collect small samples at regular intervals for analysis at 130. The further processed material will then be disposed in super sacks or suitable carrier, weighed, labeled and transported for end users to reclaim the valuable metals and other materials from the recycled materials at 132.

In an alternative example, the source of batteries 150 will be provided and processed in a first comminution/shredding operation at 152. The shredded batteries will be retained in a reaction chamber with evacuation of combustion and chemical byproducts at 154. A gas evacuation/scrubbing system 155 may be provided to evacuate the reaction chamber. The shredded batteries are disposed in the reaction chamber until ready for further processing via a second comminution/shredding step at 156, to form a substantially homogenous material. The homogenous materials may then be sampled to evaluate the components in the source of batteries for assessment of value and disposition.

Although the present invention has been described with reference to various examples, it should be recognized that other versions and uses are possible. For example, the procedure is not limited to lithium based batteries but is also usable for recycling of other types of batteries or compositions which may create hazards or toxic materials. Accordingly, it is not intended that the invention be limited except by the appended claims.

What is claimed is:

1. A process for the recycling of electrical storage batteries having hazardous anode, cathode and electrolyte combinations comprising:
   a) supplying a source of batteries,
   b) comminuting the batteries to generate a comminuted material and expose the volatile components thereof,
   c) introducing the comminuted material into a neutralizing medium to form a neutralized material;
   d) forming a substantially homogenous material from the neutralized material; and
   e) sampling of the substantially homogenous material.

2. The process of claim 1, wherein the step of comminuting is performed prior to introduction into the neutralizing medium and after neutralization to generate the substantially homogenous material.

3. The process of claim 1, further comprising screening of the comminuted material to form the homogenous material having a predetermined size distribution.

4. The process of claim 1, wherein the predetermined size distribution is below about one inch.

5. The process of claim 1, further comprising drying the comminuted material after being disposed in the neutralizing medium.

6. The process of claim 1, wherein the step of sampling system is automatically performed at predetermined intervals from the stream of neutralized material as it is created.

7. The process of claim 1, further comprising evacuating and scrubbing outgasses from the comminuted material.

8. The process of claim 1, further comprising performing at least a second comminuting step after being introduced into the neutralizing medium.

9. The process of claim 8, wherein the at least second comminuting step forms a substantially homogenous material.

10. The process of claim 1, further comprising screening the comminuted material.

11. The process of claim 1, further comprising detecting when the materials are substantially neutralized.

12. The process of claim 1, further comprising scrubbing the volatile components generated from the comminuted material.

13. The system of claim 12, wherein the scrubbing uses an alkaline scrub solution and filters.

14. The process of claim 1, wherein the step of neutralizing uses about a six percent brine solution.

15. The process of claim 1, further comprising drying the comminuted material after being neutralization.

16. The process of claim 1, wherein the sampling is performed automatically.

17. The process of claim 1, further comprising capturing outgassing from the comminuted material.

* * * * *